United States Patent Office 2,746,470
Patented May 22, 1956

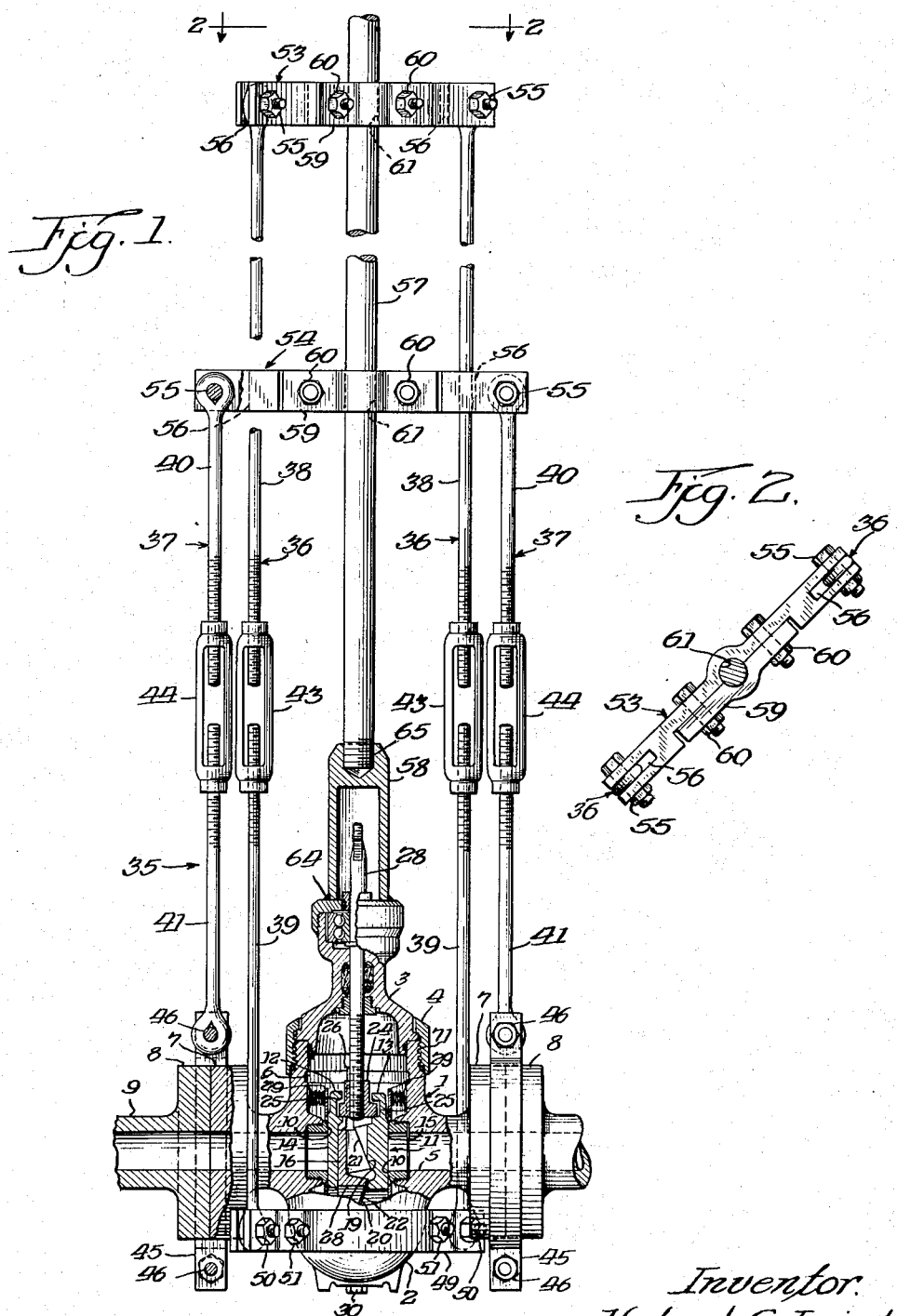

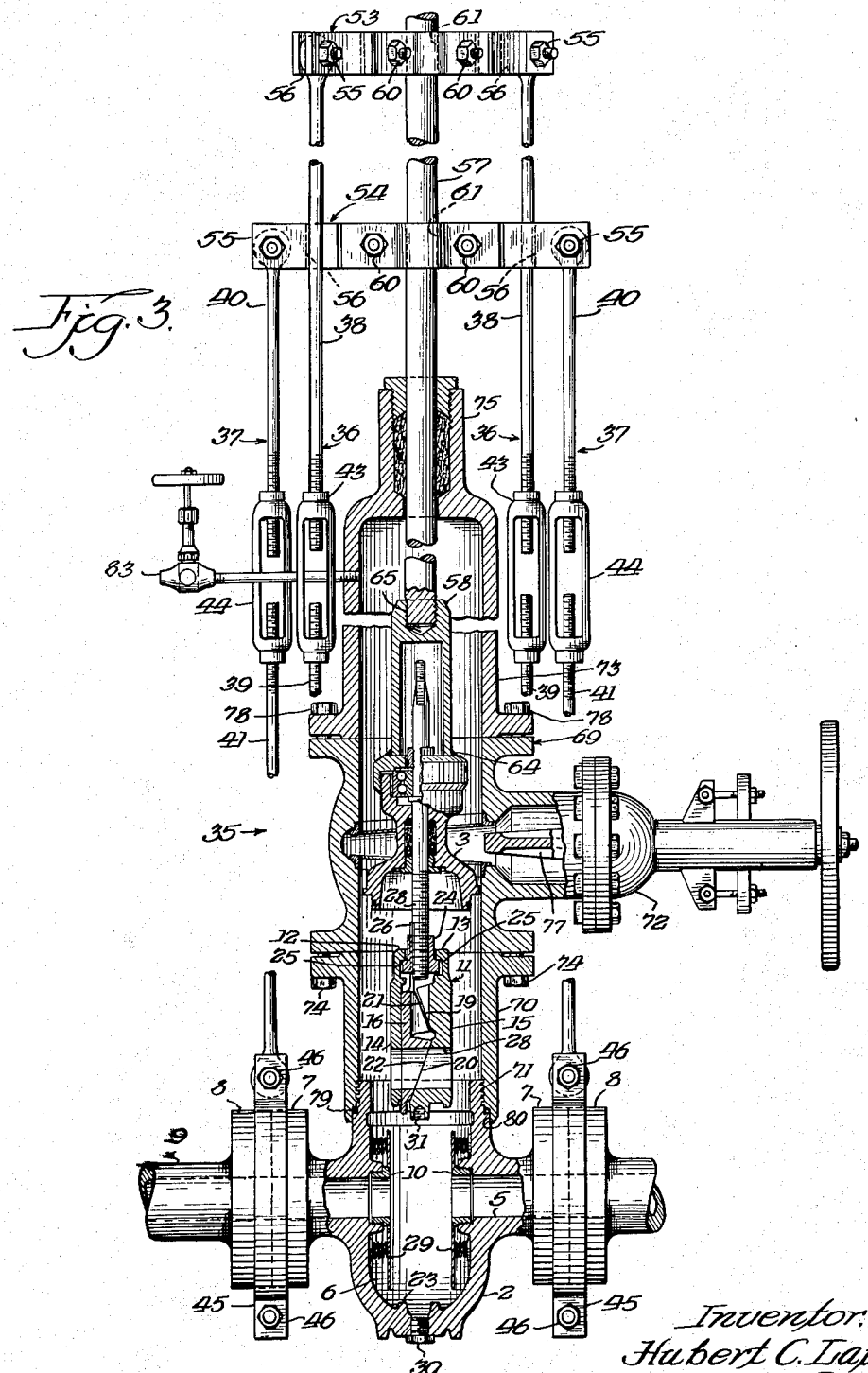

2,746,470
CONSTRUCTION AND METHOD FOR REPAIR OF VALVES UNDER PRESSURE

Hubert C. Laird, Oak Park, Ill., assignor to Crane Co., Chicago, Ill., a corporation of Illinois Application December 2, 1954, Serial No. 472,591

6 Claims. (Cl. 137—15)

This invention relates generally to a novel valve construction and more particularly pertains to a means for the repair of valves under pressure.

In co-pending applications, Serial No. 472,499, filed December 1, 1954, and Serial No. 472,676, filed December 2, 1954, inventions relating to means for replacing broken valve stems when stem failure occurred with the closure in either the upper or lower positions were presented. In each instance, means was provided through the bottom of the valve for securing and locking the valve closure member in the lower sealed position or for first drawing the closure member into this position, prior to locking it therein for removal of the bonnet under pressure and replacement of the valve stem. Replacement of bearings and other parts and repacking of the valve can also be accomplished in this manner.

Should a portion of the valve become damaged or fail which cannot be replaced in this manner, however, as for instance the valve disc or one of its parts or the nut through which a non-rising stem may be threaded, it is evident that another method or some other means will be necessary to permit replacement of these latter parts with the valve under full line pressure.

According to the present invention, a fluid tight casing or housing is placed over the bonnet of the valve to be repaired in fluid tight engagement with the body thereof and the bonnet, valve stem and attached disc caused to be pulled from the body and into a portion of the casing beyond a close off valve which when shut permits opening of that portion of the casing and removal of the valve parts for repair or replacement thereof. The parts may, of course, be reassembled by the reverse process.

It is therefore a principal object of this invention to provide for the removal and replacement of valve closures and other parts under full line pressure or, where repair of the valve is impossible, the stem and bonnet may be replaced, or preferably the valve body capped without return of the parts to provide for free fluid flow through the valve casing.

Other objects and advantages will become more readily apparent upon proceeding with the specification read in light of the accompanying drawing, in which Fig. 1 is a view partly in section of a valve to be repaired with part of the equipment of this invention in mounted relation with the valve.

Fig. 2 is a cross section taken on line 2—2 of Fig. 1.

Fig. 3 is a view similar to Fig. 1, but showing further equipment mounted on the valve and the bonnet, valve stem and disc of the latter in a partly pulled condition.

Referring more particularly to the drawing, 1 is a conduit type gate valve to which the construction of the present invention is applied as hereinafter will be explained for removal and replacement of internal parts under pressure.

The said valve comprises a body 2 through which extends the flow passage 5 and at each end of which are provided flanges 7 for connection to the flanges 8 of a pipeline 9 by any suitable means, such as bolting or clamping. Intersecting the flow passage is the valve chamber 6 extending into the bonnet 3 secured to the top of the body by means of the threaded bonnet ring 4, as shown. Mounted for reciprocal movement within the valve chamber is a multi-piece gate or valve disc 11 comprising outer valve parts 12 and 13 and an inner floating wedge part 16. The outer parts are notched at the top at 25 for reception of a nut element 24 through which extends the non-rising threaded stem 28 mounted through the top of the bonnet and rotatable by means of a handwheel (not shown) normally mounted on the threaded upper end of the said valve stem at 63. It is obvious that upon rotation of the handwheel, the valve stem is turned effecting reciprocal movement of the outer valve parts 12 and 13 through the engaging nut element and that this in turn carries the floating wedge member 16 therealong in reciprocal movement.

Details of this type of gate construction are disclosed in and form the subject matter of co-pending application Serial No. 297,328, filed July 5, 1952. However, it may briefly be stated that the outer flat parallel faces 14 and 15 of the valve parts 12 and 13 are adapted to seat against the parallel seat surfaces 8 of the body 2. These surfaces although shown on separate seat rings threadedly received within the body may, of course, be on integral portions of the body. On the other hand, floating or plunger type seat rings may be employed, the upstream ring being actuated against the valve disc which may be a flat plate of constant thickness by line pressure, the seat rings being sealed within the body by means of O-rings. The intermediate floating wedge part 16 of the valve illustrated is provided with upper and lower wedge surfaces 19 and 20, respectively, for engagement with corresponding wedge surfaces 21 and 22 of the valve part 13 for sideward expansion of the valve disc 11 in either extremity of reciprocal movement thereof. More particularly, when the gate member is moved downwardly for valve closing, the bottom of the floating wedge part 16 first contacts a stop 23 in the bottom of the body which arrests further movement, while the outer parts 12 and 13 are further forced downwardly past the inner valve part by the action of the valve stem and nut whereby a wedging action is initiated between the upper wedge surfaces 19 and 21 of the intermediate part and outer valve part 13. This wedging action obviously provides transverse spreading in effect forcing both of the valve parts 12 and 13 outwardly into fluid tight engagement with the aforesaid seat surfaces 8 of the body.

For valve opening, the valve stem is rotated in the opposite direction which first lifts the nut element 24 into contact with the top of the slots 25 and then forces the outer valve parts 12 and 13 upwardly, releasing the wedging force and permitting collapse of the valve disc with the help of the fluid pressure acting on the side of the disc. Continued upward movement raises the disc in the collapsed condition until the upper projects on each side of the floating wedge part (only one being shown, and identified 26) makes contact with the top of the valve chamber at which time the intermediate or floating wedge part is again arrested in its movement, while the outer parts 12 and 13 are forced this time upwardly to initiate wedging action between the lower wedging surfaces of the intermediate part and outer part 13 producing similar expansion to that already described in connection with the downward movement with the port 28 in straight through fluid tight registry with the flow passage 5 of the body. To complete the valve construction, pressure plates 29 are provided, one at each side of the valve disc, which are resiliently held in contact therewith for removing the excess lubricant from the sides of the disc and preventing leakage within the flow passage. A plug 30 is also employed in the bottom of the body which may be removed for insertion of a locking bolt or element in accordance with the co-pending application Serial No. 472,499, filed December 1, 1954, above referred to, which engages a threaded recess 31 in the bottom of valve part 13 for securing the closure member preferably in the lowermost fluid tight expanded position, while permitting removal of the bonnet and certain valve parts under pressure.

In co-pending application Serial No. 472,676, also referred to, a special construction was provided which was attachable to the bottom of the body for removal of the plug 30 under pressure and subsequent engagement of the threaded socket or recess 31 in the bottom of valve part 13 when the valve disc should be at a position other than the lowermost closed position for pulling of the valve disc into said lowermost fluid sealed condition and locking the same therein for removal of the bonnet and subsequent replacement of the valve stem and certain other parts as covered in the application.

As pointed out in the preamble, these two co-pending cases are concerned primarily with the replacement of broken valve stems and bearings occasioned by the valve operator forcing the valve as by the application of a bar or wrench to the handwheel and with repacking of the valve where ordinary packing is employed. However, the above items are not the only ones liable to fail or require replacement. Use of a bar or wrench also exerts great stress in the nut element 24 tending to shear the ears, strip the threads or otherwise fracture the member. The disc itself is subject to high stress especially when great effort is being made to break it loose from a condition of seizure or sticking as caused by long periods of disuse, corrosion or otherwise which often results in failure. Should injury or failure be sustained by either the nut member or disc or, if it is desired to remove the same for inspection, it is rather obvious that the methods advanced in the said copending applications cannot be resorted to, since insufficient clearance is present for removal of the nut member without the disc and the above methods require the disc for sealing off the pressure prior to removal of the bonnet.

The present invention therefore provides for the removal of additional internal valve parts including the disc itself, under full line pressure. This is of special importance in the oil and gas well "well head" connections where such provisions are desired for valves used as the bottom or sole master valve or a wing valve having no cut-off point below the same in what is termed a Christmas tree construction. Without such provision, it would be necessary to "kill" the entire well, an extremely costly as well as risky operation as far as getting the well to redeliver, should valve failure or inoperability occur.

To accomplish such removal of internal parts under full well pressure for instance for repair or replacement of the said parts, a special construction generally designated 35 is employed. This construction according to the present invention comprises inner and outer take up means, shown in the drawing as inner and outer turnbuckle means designated 36 and 37, respectively, although single eye bolts and nuts may be employed if desired for take up purposes. The preferred turnbuckle means comprise upper and lower eye bolts 38 and 39 and 40 and 41 and turnbuckles or nuts 43 and 44 for the inner and outer sets respectively. The outer turnbuckle means are secured to the valve body by means of ring clamps 45 formed of two halves held together by bolts 46, the eye of the eye bolts 41 being received between the halves, the upper bolts extending through the eyes. Actually, the ring clamps extend over the flanges 8 of the adjacent pipe sections, as shown, although they may be adjusted to grip the flanges of the valve body only. The inner turnbuckle means on the other hand are secured to the valve body by means of the clamp 49 extending around the lower part of the body as shown. This clamp comprises two halves as before, the halves being held together in this instance by pairs of bolts at each end. The outer bolts 50 of each pair extend through the eyes of the eye bolts 39, the ends of each of the clamp halves being spaced from each other outwardly of the inner bolts 51 for reception of the ends of the eye bolts. Both the inner and outer turn buckle means are connected at the top to tie bars or clamps 53 and 54 extending between the pairs of turn buckle means by means of bolts 55. The ends or heads of the upper eye bolts are actually received within the slots 56 at each end of the tie bars. These tie bars, which are identical are adapted to extend around and tightly grip a shaft or auxiliary stem member 57 extending from a hollow tubular member 58 that is welded or otherwise secured to the top of the bonnet for the purpose to be explained later. The tie bars are secured in tight engagement with the auxiliary stem member by means of the set-in portions 59 which are affixed to the main portion of the tie bars by means of bolts 60, one on each side of the central recess or bore 61 through which the stem member passes. The tie bars or cross members with their respective turnbuckle means are set at a slight angle with respect to each other as clearly appears from the drawing so as not to create interference therebetween.

In installing the construction disclosed up to this point, the handwheel of the valve (not shown) is removed from its normal position at the upper end of the valve stem and the tubular member 58 inserted over the valve stem and welded in place to the top of the bonnet 3 at 64. The stem member 57 can then be attached to the top of the tubular member by means of the threaded connection at 65. The inner set of turn buckle means are next connected to the valve body by means of the clamp 49 and secured to the tie bar 53 at the top, which tie bar is tightened onto the stem member 57 by means of bolts 60 in clamped relation, as shown in the drawing. The turnbuckles 43 are then tightened to take up looseness of connection and to apply a downward force or load on the top of the bonnet through the stem member 57 and the lower piece 58. The bonnet ring 4 can now be safely unscrewed from the valve body 2 and slipped up over the members 58 and 57 to a position just below the tie bar 53. The outer turnbuckles are then attached to the valve body by means of the clamps 45 and secured at the top to the tie bar 54 which is tightened in clamped engagement around the stem member 57 below the bonnet ring. The upper tie bar 53 may now be disassembled and moved to one side, after the turnbuckles 44 are tightened to apply a downward load on the bonnet for removal of the bonnet ring over the top of the stem member 57. The turnbuckles 43 are preferably loosened before disassembly of the upper tie bar to remove the load therefrom.

The next step to be achieved is the assembly and mounting of the fluid tight housing generally designated 69, also part of the special construction 35, on the upper end of the valve body 2 in fluid tight relation therewith and extending over the bonnet 3 and tubular member 58. This housing comprises a lower tubular flanged member 70 threadedly engageable with the threads 71 of the valve body, a suitable gate valve member 72 having a port diameter preferably of the same size and not less than the inside diameter of the flanged member and an upper hollow member or means 73 attachable to the valve member by means of bolting in similar fashion to the bolted connection of the lower member to the valve member at 74. Although the upper hollow member is shown as constituting a single section or piece, it may of course be built up of more than one piece. The upper member is provided with a stuffing box 75 for fluid sealed engagement around the stem member 57. The fluid tight housing 69 may be assembled ahead of time and slipped onto the upper part of the stem member 57, the valve member 72 being in open position, with the lower tie bar 54 in clamped position on the stem member. Or, each of the three pieces, that is, the lower member 70, the valve member 72 and the upper member 73 may be so placed on the stem member above the lower tie bar one at a time in the order named to be assembled together when moved past the lower tie bar in turn and engaged on the upper end of the valve body as shown. In either case, after the complete assembly or the individual parts are placed on the stem member above the assembly or part and the turn buckles 43 tightened, after which the other set of turnbuckles are loosened and the lower tie bar detached for passage of the assembly or part down along the stem member into the proper position. Where the individual members are mounted separately, this process, of course, must be repeated for each member. After the first member has been moved into position and threaded onto the valve body, the lower tie bar must, of course, be reassembled and secured in tight engagement with the stem member with the proper turnbuckles tightened while the upper tie bar is removed for placement of the next part on the stem member above the lower tie bar, the cycle then being complete. The controlling factor as to whether the housing 69 can be moved past the tie bars as a complete assembly or as separate pieces for subsequent assembly of course depends on the space available between the points of attachment for the upper and lower tie bars.

When the housing 69 has been mounted on the top of the valve body, being so mounted in fluid tight relation thereon by means of the O-ring 79 received within the annular relief or notch 80 at the lower end of the housing member 70 and engaging an annular surface extending around the body below the threads 71, both of the tie bars 53 and 54 are loosened from the stem member 57 and upward or outward force is applied to the latter by any suitable means (not shown) so as to pull the valve bonnet 3 which is secured to the bottom of the tubular member 58 by means of the welding at 64 away from the body 2 and upwardly beyond the valve member 72. The latter valve member is then placed in the closed position, sealing off the internal pressure of the valve 1 and the portion of the housing 69 below the closure member 77, after which the upper housing member 73 is removed from the valve member 72 by unloosening of the bolts or cap screws 78. The bonnet 3 and lower tubular member 58 may then be unscrewed from the stem member 57 and removed from the upper housing member. A bleed valve 83 is preferably provided which should, of course, be opened preparatory to the separation of the joint between the upper housing member and valve member so as to relieve the entrapped pressure within the upper part of the housing.

If the valve stem 28 and the other internal parts of the valve to be disassembled and repaired are intact upward force onthte stem member 57 should pull the valve closure 11 loose from within the valve body 2, such as shown in Fig. 3. In this case, the length of the upper member 73 of the housing or it should be said the length of the housing above the closure 77, should be long enough to receive the valve bonnet, stem and closure unit of the valve to be repaired. After removal of the latter from the housing by opening the same between the valve member and upper member 73, the valve disc may be taken apart and reconditioned or a new valve disc or parts may be provided and inserted within the valve 1 by the reverse process. Should the valve stem break in the process of trying to extract the disc or should it have been previously broken, only the bonnet and upper piece of the broken stem can be removed at first. Suitable tools may be employed, being attached to the threaded end of the stem member 57 and passed through the pressure housing after assembly thereof and opening of the valve member 72, for getting hold of the broken piece of stem or the disc for extraction of the latter. Or, it may be possible to withdraw the broken stem piece from the nut element by unscrewing the same therefrom, in which case the inside of the nut element may then be engaged by a threaded attachment or other means for extraction of the parts. If a valve part is broken, the remaining piece and any other valve part remaining, can be fished out after removal of the rest of the unit.

It is therefore evident that unique means are provided for opening of valves under full line pressure and removal and replacement of internal parts, including the valve disc itself, which fills a long time need in industry, particularly the oil producing industry.

Although a special conduit type gate valve has been illustrated, the broad concept of the invention is not to be restricted to that valve, but may be applied to other gate valves of the conduit type or otherwise and generally to other valves openable at the top for withdrawal of the valve disc and internal parts.

It should be evident from the above that in view of the construction of the present invention, a new method is provided for removal of internal valve parts under fluid pressure.

The invention is of course capable of being applied in many ways and therefore should be limited only by the terms of the appended claims falling within the broad spirit thereof as illustrated and set forth in the specification.

I claim:

1. In combination with a valve body, a substantially fluid tight housing connected to said valve body in substantially fluid tight relation therewith, said housing comprising at least a gate valve and upper hollow means, said gate valve being below said upper hollow means, said housing including reciprocally movable means extending through the top of the upper hollow means and movable through the gate valve when the latter valve is in open position, a removable bonnet normally in fluid tight relation with said valve body, a valve stem passing through said bonnet and a valve disc connected to the valve stem below its passage through the bonnet, said reciprocally movable means being contactable with the said bonnet when the gate valve of the substantially fluid tight housing is open, the length of the housing above the closure member of the gate valve being sufficient to contain the valve stem, bonnet and valve disc when drawn away from the valve body and up into the housing as a unit where feasible, a pair of elongated take-up means secured to said valve body and extending along opposite sides of the said housing and reciprocally movable means thereof, tie bar means connecting the upper portions of the take-up means and adapted to engage the said reciprocally movable means in tight gripping clamped relation, a second pair of elongated take-up means secured to the said valve body and extending along opposite sides of said housing and reciprocally movable means, second tie bar means connecting the upper portions of said second pair of elongated take up means, said second tie bar means also being adapted to engage the said reciprocally movable means in tight gripping clamped relation, said second take-up means and second tie bar means being disposed at an angle relative to the first so as not to interfere with the same, one pair of said take-up means being longer than the other so that the connecting tie-bar means is engageable with the reciprocally movable means at a point above the point of engagement between the other tie bar means and the reciprocally movable means and connecting the said other take up means and the reciprocally movable means, each pair of take up means being adapted to apply a downward force on said reciprocally movable means through their respective tie bar means when in clamped relation with the said reciprocally movable means.

2. In combination with a valve body provided with external threading adjacent the upper end, a substantially fluid tight housing connected to said valve body in substantially fluid tight relation therewith, said housing comprising a lower tubular member threadedly engaging the said external threading of the valve body, a gate valve and upper hollow means, said gate valve being connected between the said lower tubular member and upper hollow means of the housing, said housing including a reciprocally movable stem member extending through the top of the upper hollow means and movable through the gate valve and lower member when the gate valve is in open position, an elongated member connected to the said stem member at the lower end thereof and reciprocally movable therewith, a removable bonnet normally resting on top of the said valve body, a valve stem passing through said bonnet and a valve disc connected to the valve stem below its passage through the bonnet, said elongated member at the lower end of the aforesaid stem member being secured to the bonnet and extending over the said valve stem, the length of the housing above the closure member of the gate valve being sufficient to contain the valve stem, bonnet and valve disc when drawn away from the valve body and up into the housing by the stem member upon upward force being applied to the latter, a pair of elongated take up means secured to said valve body and extending along opposite sides of said housing and stem member thereof, tie bar means connecting the upper portions of the take up means and adapted to engage the stem member in tight gripping clamped relation, a second pair of elongated take-up means secured to the said valve body and extending along opposite sides of said housing and stem member thereof, second tie bar means connecting the upper portions of said second pair of elongated take up means, said second tie bar means also being adapted to engage the stem member in tight gripping clamped relation, said second take up means and second tie bar means being disposed at an angle relative to the first so as not to interfere with the same, one of said take up means being longer than the other so as to be engageable with the stem member at a point above the point of engagement between the said other tie bar means and stem member, the space between the two tie bar means being sufficient to allow placement of at least the gate valve and upper hollow means in turn therebetween, each pair of take up means being adapted to apply a downward force on said stem member through said tie bar means when in clamped relation with the stem member.

3. In combination with a valve body, a substantially fluid tight housing connected to said valve body in substantially fluid tight relation therewith, said housing comprising at least a gate valve and upper hollow means, said gate valve being below said upper hollow means, said housing including reciprocally movable means extending through the top of the upper hollow means and movable through the gate valve when the latter valve is in open position, a removable bonnet normally in fluid tight relation with said valve body, a valve stem passing through said bonnet and a valve disc connected to the valve stem below its passage through the bonnet, said reciprocally movable means being contactable with the said bonnet when the gate valve of the substantially fluid tight housing is open, the length of the housing above the closure member of the gate valve being sufficient to contain the valve stem, bonnet and valve disc when drawn away from the valve body and up into the housing as a unit where feasible, attachment means extending around the lower part of the valve body in engagement therewith, a pair of elongated take up means attached to said attachment means one at each side thereof and extending along opposite sides of the housing and reciprocally movable means thereof, tie bar means connecting the upper portions of the take up means and adapted to engage the reciprocally movable means in tight gripping clamped relation, said elongated take up means being connected at the top to opposite ends of the tie bar means, a pair of attachment means extending around the valve body at opposite sides thereof, a second pair of elongated take up means attached to the latter attachment means, one to each one of the pair, and extending along opposite sides of said housing and reciprocally movable means thereof, second tie bar means adapted to engage the reciprocally movable means in tight gripping clamped relation, said second pair of elongated take up means being connected at the top to opposite ends of the second tie bar means, said second take up means and second tie bar means being disposed at an angle relative to the first so as not to interfere with the same, said one pair of take up means being longer than the other so that the connected tie bar means is engageable with the reciprocally movable means at a point above the point of engagement between the said other tie bar means and reciprocally movable means, the space between the two tie bar means being sufficient to allow placement of at least the gate valve and upper hollow means in turn therebetween, each pair of take up means being adapted to apply a downward force on said reciprocally movable means through said tie bar means when in clamped relation with the reciprocally movable means.

4. The subject matter of claim 1, each of said elongated take up means comprising a turnbuckle nut and eye bolts extending therefrom at opposite ends.

5. The method of removing valve parts under pressure of a valve having a body, a removable bonnet in fluid tight relation with the body, a valve stem passing through the bonnet, a valve disc attached to the stem below its passage through the bonnet and means for securing the bonnet in the fluid tight relation with the body, said method comprising the steps of securing the valve bonnet against upward movement by the application of downward force thereon, removal of the securing means of the bonnet while maintaining the tight engagement of the bonnet with the body by continued downward force on the bonnet, mounting substantially fluid tight means on the body over the bonnet and valve stem in substantially fluid tight relation with the valve body while continuing the downward force on the bonnet, ceasing the downward force on the bonnet and applying upward force on the bonnet moving the latter and at least a portion of the valve stem, and any parts attached to the valve stem such as the valve disc, upwardly and away from the valve body and beyond a close off place in the substantially fluid tight means, causing the latter fluid tight means to be closed against fluid pressure across its entire extent at the place of close off, opening the substantially fluid tight means above the place of close off and removal of the valve parts therein contained.

6. The method of removing valve parts under pressure of a valve having a body provided with external threading adjacent the upper end, a removable bonnet resting on top of the body, a valve stem passing through the bonnet, a valve disc attached to the stem below its passage through the bonnet and a bonnet ring threadedly engaging the threads of the body and extending over a portion of the bonnet whereby to retain the bonnet in tight engagement with the body, said method comprising the steps of securing the valve bonnet against upward movement by the application of downward force thereon, unscrewing the bonnet ring from the valve body and removal of it from engagement with the bonnet and from the valve while maintaining the tight engagement of the bonnet with the body by continued downward force on the bonnet, mounting substantially fluid tight means on the body over the bonnet and valve stem by threadedly engaging the means on the threads of the valve body while maintaining the downward force on the bonnet, ceasing the downward force on the bonnet and applying upward force on the bonnet moving the latter and at least a portion of the valve stem and any parts attached to the valve stem such as the valve disc upwardly and away from the valve body and beyond a close off place in the substantially fluid tight means, causing the latter fluid tight means to be closed against fluid pressure across its entire extent at the place of close off, opening the substantially fluid tight means above the place of close off and removal of the valve parts therein contained.

References Cited in the file of this patent

UNITED STATES PATENTS

| | | |
|---|---|---|
| 1,607,463 | Kent | Nov. 16 1926 |
| 2,664,262 | Mueller et al. | Dec. 29, 1953 |